United States Patent

Chi

[11] Patent Number: 5,080,519
[45] Date of Patent: Jan. 14, 1992

[54] COUPLING FOR SECURING A HANDLEBAR TO A BICYCLE FRAME

[76] Inventor: Yi Chen Chi, No. 139-5, Anmei Rd., Meishan Tsun, Houli Hsiang, Taichung Hsien, Taiwan

[21] Appl. No.: 736,948

[22] Filed: Jul. 29, 1991

[51] Int. Cl.⁵ ............................................. F16B 1/00
[52] U.S. Cl. .................................. 403/24; 403/324; 403/374; 403/104
[58] Field of Search ............. 403/324, 374, 378, 379, 403/104, 325, 327, 319, 24

[56] References Cited

U.S. PATENT DOCUMENTS 3,014,545 12/1961 Shepley .................. 403/327 X
4,523,338 6/1985 May ...................... 403/378 X
4,960,342 10/1990 Chi ........................... 403/24

Primary Examiner—Andrew V. Kundrat
Attorney, Agent, or Firm—Bacon & Thomas

[57] ABSTRACT

A coupling for securing a handlebar to a bicycle frame that carries a bowl through which a standpipe is received, the bowl including a bore formed in a center for receiving the standpipe and a hole communicated with the bore, two members received in the hole and in contact with the standpipe, a bolt extended through one of the members and threadedly engaged with the other member so that the members can be clamped together by the bolt and so that the standpipe can be fixed in place by the members.

4 Claims, 2 Drawing Sheets

COUPLING FOR SECURING A HANDLEBAR TO A BICYCLE FRAME

BACKGROUND OF THE INVENTION

1. Field of the Invention

The present invention relates to a coupling, and more particularly to a coupling for securing a handlebar to a bicycle frame.

2. Description of the Prior Art

The closest related prior art of which applicant is aware is his prior U.S. Pat. No. 4,960,342 to Chi, filed Mar. 15, 1990, entitled "COUPLING FOR SECURING A HANDLEBAR TO A BICYCLE FRAME". The standpipe of the handlebar is fixed in place by the threaded engagement between the outer thread of the standpipe and the inner thread of the compression nut. The compression nut may become loose after long term of usage if the compression nut is not solidly fixed in place.

The present invention has arisen to provide a novel coupling for securing the handlebar of the bicycle.

SUMMARY OF THE INVENTION

The primary objective of the present invention is to provide a coupling which is capable of solidly fixing the handlebar in place.

In accordance with one aspect of the invention, there is provided a coupling for securing a handlebar to a bicycle frame that carries a bowl through which a handlebar standpipe is received, the bowl including a bore formed in a center for receiving the handlebar standpipe and a hole laterally formed therein and communicated with the bore, a first member, a spring and a second member received in the hole of the bowl, the two members being in contact with the handlebar standpipe, a bolt extended through the second member and the spring and threadedly engaged with the first member so that the first member and the second member can be clamped together by the bolt and so that the handlebar standpipe can be fixed in place by the first member and the second member.

Further objectives and advantages of the present invention will become apparent from a careful reading of the detailed description provided hereinbelow, with appropriate reference to the accompanying drawings.

DETAILED DESCRIPTION OF THE INVENTION

Figure 1:
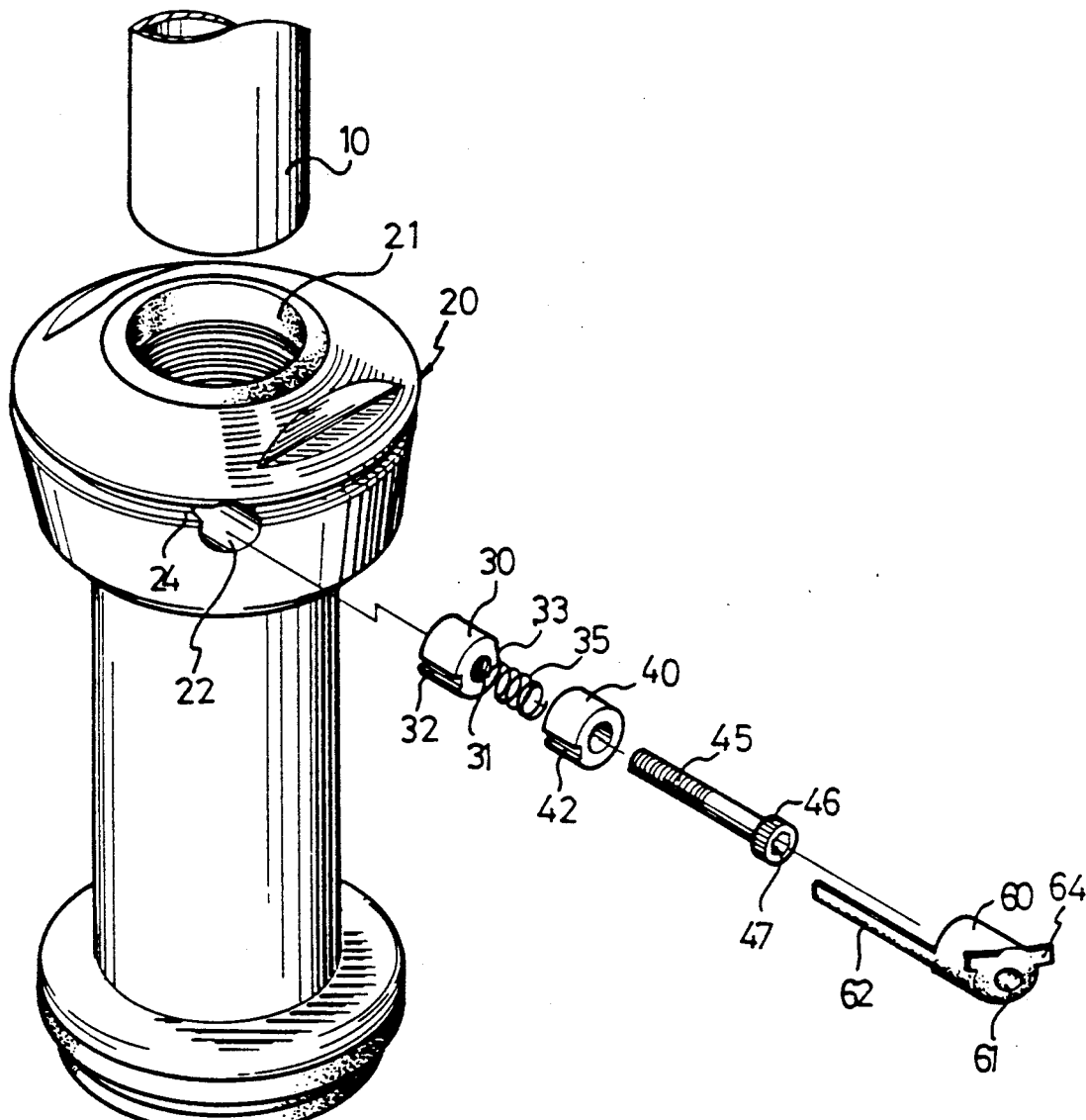
FIG. 1 is an exploded view of a coupling in accordance with the present invention.
Figure 2:
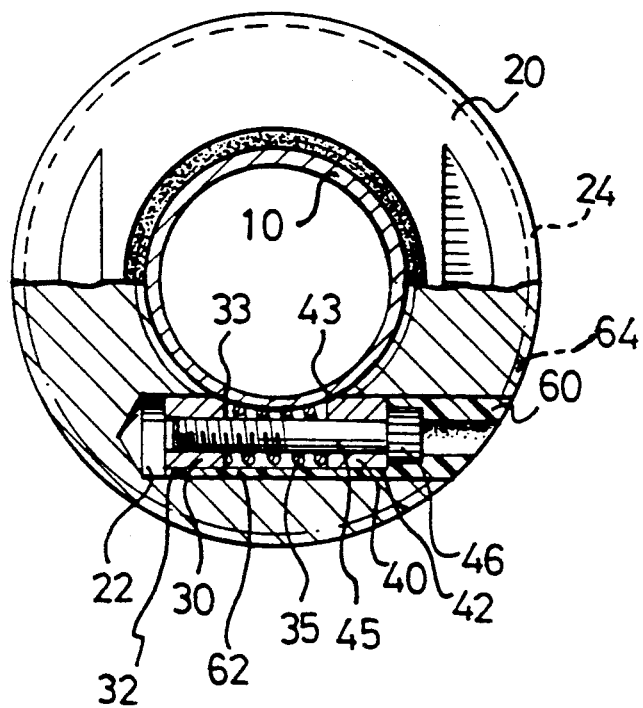
FIG. 2 is a cross sectional view taken along lines 2—2 of FIG. 1.

Referring to the drawings, a coupling for securing a handlebar to a bicycle frame in accordance with the present invention comprises generally a bowl 20 having a bore 21 formed in a center thereof for receiving a handlebar standpipe 10. A hole 22 is laterally formed in the bowl 20 and is communicated with and tangent with the bore 21 of the bowl 20, as best shown in FIG. 2. An annular groove 24 is formed in the outer peripheral surface of the bowl 2 and is communicated with the hole 22.

A first member 30, a spring 35 and a second member 40 are received in series in the hole 22 of the bowl 20. The first member 30 has an inner thread 31 formed therein for threadedly engagement with a bolt 45 and has a slot 32 longitudinally formed in the outer peripheral surface thereof. The spring 35 and the second member 40 are engaged on the bolt 45. The second member 40 has a slot 42 longitudinally formed in the outer peripheral surface thereof. Each of the members 30, 40 includes a curved surface 33, 43 formed therein and in contact with the outer peripheral surface of the handlebar standpipe 10. The bolt 45 includes a head 46 which has a recess 47 formed therein for receiving a wrench or the like so that the bolt 45 can be rotated and so that the two members 30, 40 can be clamped together by the bolt 45 and such that the handlebar standpipe 10 can be fixed in place by the two members 30, 40. The members 30, 40 can be separated with each other by the spring 35 when the bolt 45 is unthreaded from the first member 30.

A guide 60 is generally engaged in the outer end portion of the hole 22 of the bowl 20 and includes an aperture 61 formed therein so that the wrench can be inserted therethrough in order to drive the bolt 45. The guide 60 includes a pair of ears 64 engaged in the annular groove 24 of the bowl 20 so that the guide 60 can not be rotated, and includes an extension 62 formed integral therewith for engagement with the slots 32, 42 of the members 30, 40 so that the two members 30, 40 are guided to slide longitudinally in e hole 22 only and so that the members 30, 40 can not rotate within the hole 22. The curved surfaces 33, 43 of the members 30, 40 are directed by the engagement between the slots 32, 42 and the extension 62 of the guide 60 such that the standpipe 10 can be easily inserted into the bore 21 of the bowl 20. The guide 60 can be removed after the standpipe 10 has been inserted through the bore 21 of the bowl 20, and can be kept within the hole 22 as a dust cap.

Alternatively, instead of the annular groove 24, an engaging means, such as a pair of notches can be formed in the open end of the hole 22 for receiving the ears 64 of the guide 60 so that the guide 60 can not rotate within the hole 22.

Accordingly, the coupling in accordance with the present invention can solidly secure the handlebar to the bicycle frame.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A coupling for securing a handlebar to a bicycle frame that carries a bowl through which a handlebar standpipe is received; said bowl including a bore formed in a center thereof for receiving said handlebar standpipe and a hole laterally formed therein and communicated with said bore; a first member, a spring and a second member received in series in said hole of said bowl, said first member including an inner thread formed therein, said first member and said second member being in contact with said handlebar standpipe; a bolt exended through said second member and said spring and threadedly engaged with said inner thread of said first member so that said first member and said second member can be clamped together by said bolt and said handlebar standpipe can be fixed in place by said first member and said second member.

2. A coupling according to claim 1, wherein a curved surface is formed in each of said first member and said second member and is in contact with said handlebar standpipe.

3. A coupling according to claim 1, wherein an engaging means is formed in an outer portion of said hole of said bowl, a slot is longitudinally formed in an outer peripheral surface of each of said first member and said second member, a guide is engaged in said outer portion of said hole and includes at least one ear formed thereon for engagement with said engaging means of said bowl so that said guide is prevented from rotation relative to said bowl, and an extension is formed integral with said guide and slidably engageable with said slots of said first member and said second member so that said first member and said second member are guided to move longitudinally along said hole and can not rotate within said hole.

4. A coupling according to claim 3, wherein said engaging means is an annular groove formed in an outer peripheral surface of said bowl and communicated with said hole, said ears of said guide can be engaged within said annular groove of said bowl.

* * * * *